Sept. 20, 1927.
T. H. CHADWICK
1,642,839
GLASS CUTTING MACHINE
Filed Aug. 11, 1925  3 Sheets-Sheet 2
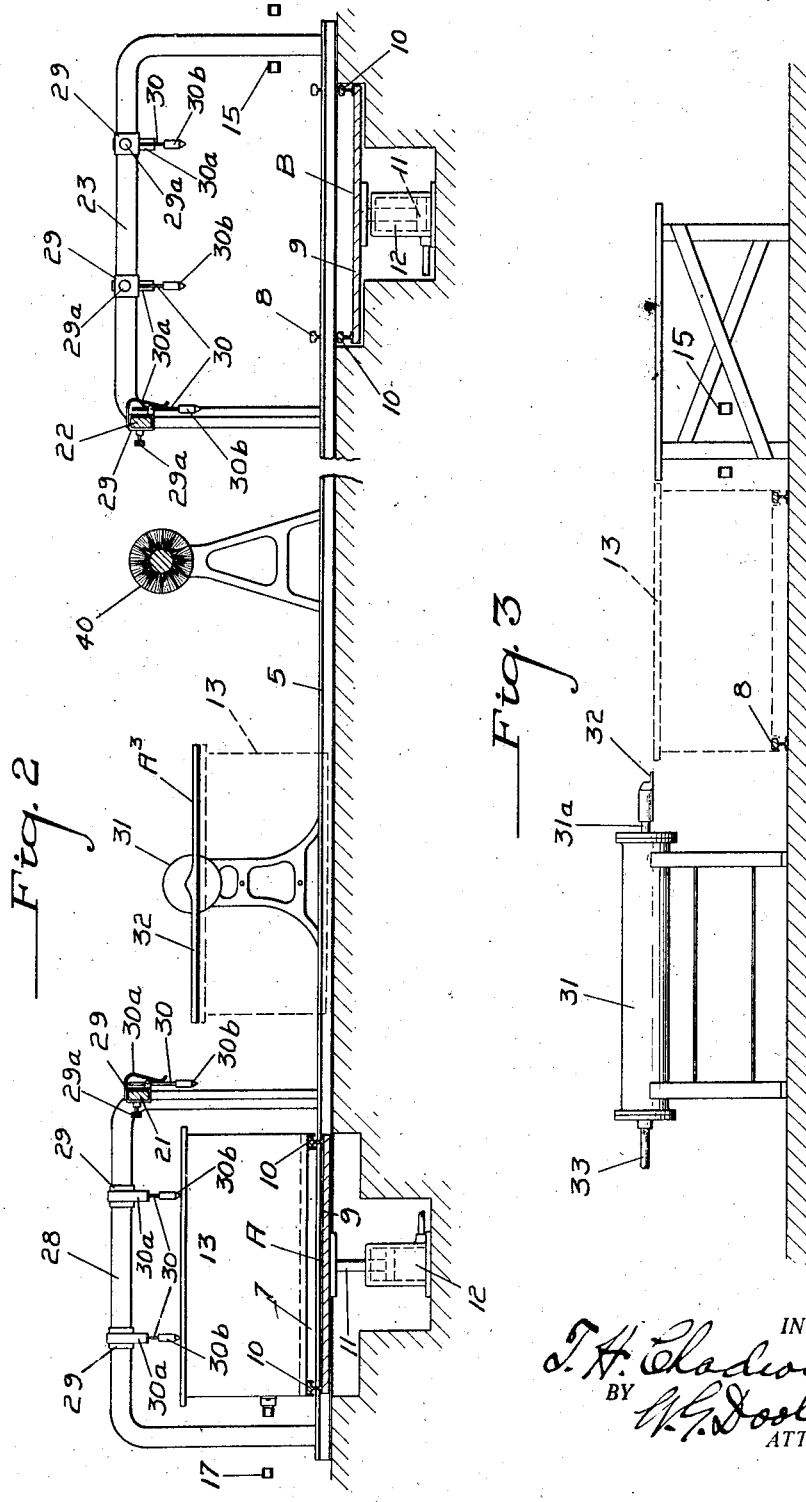
INVENTOR.
T. H. Chadwick
BY
ATTORNEY.

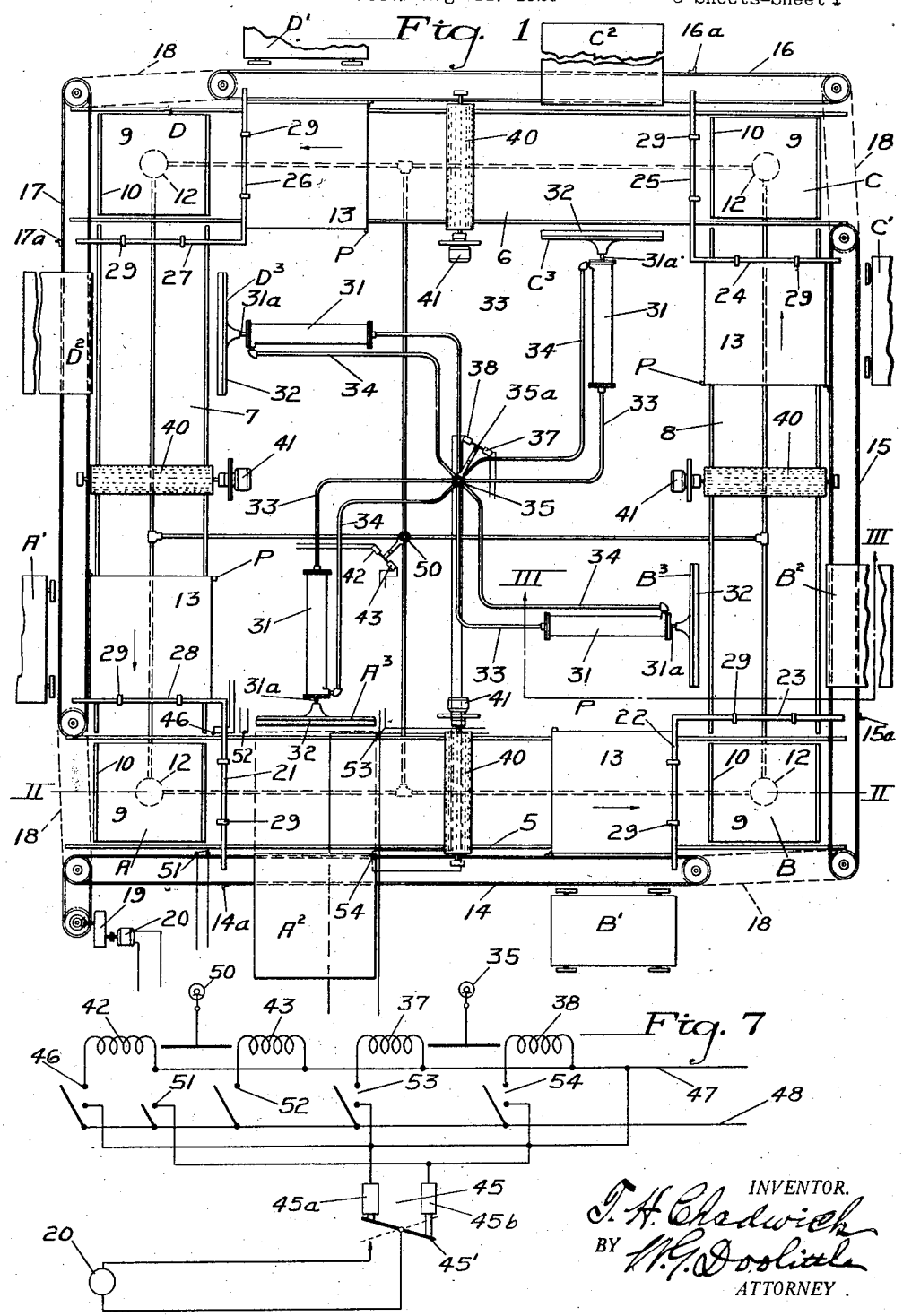

Sept. 20, 1927.
T. H. CHADWICK
GLASS CUTTING MACHINE
Filed Aug. 11, 1925
1,642,839
3 Sheets-Sheet 3
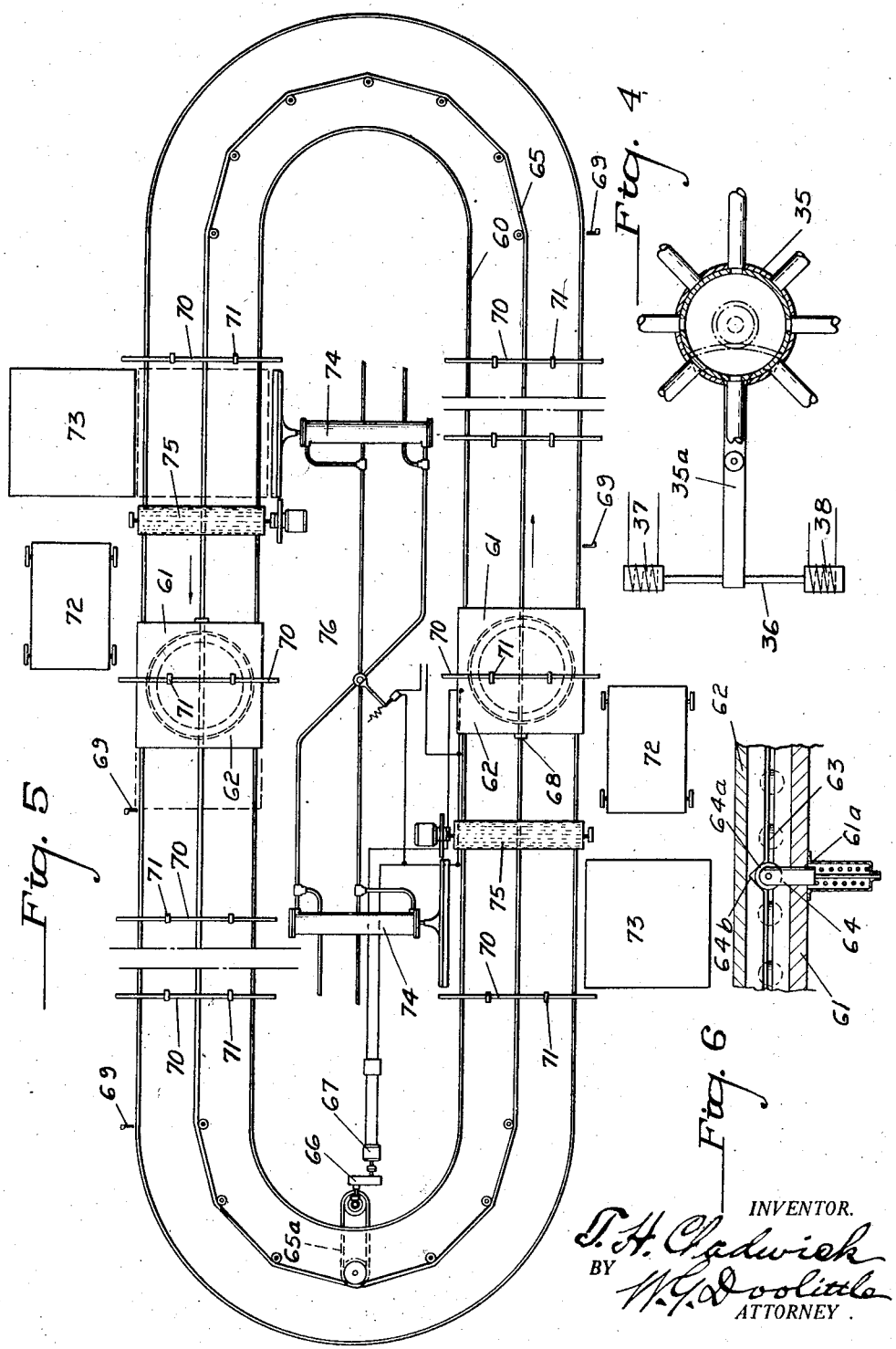

Patented Sept. 20, 1927.

1,642,839

UNITED STATES PATENT OFFICE.

THOMAS H. CHADWICK, OF PITTSBURGH, PENNSYLVANIA.

GLASS-CUTTING MACHINE.

Application filed August 11, 1925. Serial No. 49,639.

This invention is for an improvement in cutting sheets of glass.

After window glass has been manufactured it is necessary that the sheets be cut into commercial sizes. The usual practice is for such glass to be cut by hand.

The present invention has for its principal object to provide means for automatically cutting the glass. A further object of the invention is to provide a machine for this purpose which will be adjustable so as to cut glass into various sizes according to particular requirements.

A further object of the invention is to provide an apparatus wherein the glass is scored, first in one direction and then in a transverse direction, and in which the scoring is at right angles so that the edges of the pieces of glass are perfectly square.

According to the present invention, it is proposed to provide traveling tables on which sheets of glass may be placed, and to provide means for moving the glass automatically beneath adjustable scoring devices, first in one direction and then in a direction at right angles to the first cut. It is proposed to provide means for continuously moving the tables in one direction and to provide in a single machine, a plurality of tables whereby the cutting may be continuously and rapidly carried out. It is furthermore proposed to provide in such an apparatus, means for automatically removing the scored sheets from the tables, means for removing chips of glass from the tables, and to provide automatic means for controlling the movement of the tables so as to properly present the glass beneath the cutters in such manner as to effect the right angle scoring.

The invention may be readily understood by reference to the accompanying drawings in which:

Fig. 1 represents a plan view of the apparatus constructed along the lines of my invention;

Fig. 2 represents a longitudinal section in the plane of line II—II of Fig. 1;

Fig. 3 represents a transverse section in the plane of line III—III of Fig. 1, this figure showing the automatic means for removing the scored glass from the tables;

Fig. 4 is a detailed view of a form of control apparatus which may be adaptable for use with the present invention;

Fig. 5 is a view similar to Fig. 1 of a modified construction;

Fig. 6 is a detail of a portion of one of the tables used in the apparatus shown in Fig. 5; and Fig. 7 is a control circuit diagram for the apparatus shown in Fig. 1.

It will be understood that the accompanying drawings are diagrammatic and that the invention is not confined to the particular construction and arrangement of the parts therein disclosed, the drawings being merely illustrative of the principles of my invention.

Referring first to the form of apparatus shown in Fig. 1, 5 and 6 represent parallel tracks or guideways and 7 and 8 represent similar tracks or guideways at right angles to tracks 5 and 6. The four tracks 5, 6, 7, and 8 form a square or loop, and care is taken that tracks 7 and 8 are at exactly right angles to tracks 5 and 6. Tracks 7 and 8 are slightly higher than tracks 5 and 6, as best shown in Fig. 2.

The four corners of the track arrangement may be designated A, B, C and D. At each corner of the square arrangement thus provided, is an elevator platform 9 having suitably arranged rails 10 thereon. Suitable means may be provided for raising and lowering these elevator platforms. I have shown a piston 11 and cylinder 12 for this purpose. The elevators in the diagonally opposite corners A and C are normally maintained in a raised position and the elevator in corners B and D are normally maintained in a lowered position.

Mounted for movement on the several tracks are one or more tables 13. These tables are so constructed as to be accurately guided by the rails. Motion may be transmitted to the several tables by means of endless chains 14, 15, 16 and 17, arranged along the four sides of the square, 5, 8, 6 and 7 respectively. These chains are all connected through suitable sprocket chains 18 so as to be driven in unison by a common driving mechanism at 19. This driving mechanism preferably includes a motor 20. On the several chains 14, 15, 16 and 17 are suitable flights or projections 14$^a$, 15$^a$, 16$^a$ and 17$^a$, respectively. These projections engage against the outer rear corners of the table to move the tables along the tracks, and to push such tables onto the respective elevator platforms. Inasmuch as tracks 7 and 8 are disposed above tracks 5 and 6, it is necessary that a table coming from track 7 be pushed onto the raised elevator platform of corner A and that this platform then be lowered until the table is on the level of tracks 5. For the same reason, elevator C may normally be raised and must be lowered when the table moves from track 8 onto the elevator to be transferred to track 6. Since tracks 5 and 6 are lower than tracks 7 and 8, it is necessary that the elevator at corners B and D normally be lowered so that the tables may move onto the elevators, and then be raised to the level of tracks 7 and 8.

It will be noted that the disposition of the several conveyor chains is such that the rear ends thereof extend back past the elevators, while the forward ends thereof terminates just in advance of the elevator. With this arrangement, the conveyors may be relied upon to push the tables off the several elevator platforms, along the tracks, and entirely onto the next succeeding platforms.

At 21, 22, 23, 24, 25, 26, 27 and 28, are arches or stands that extend over the tracks. One of these arches is shown in elevation Fig. 2, and one of them is shown in section in this figure. Slidable along each arch, transversely across the track, are a plurality of supports or holders 29. At 29$^a$ on each holder is a set screw by means of which it may be secured in adjusted position.

Each holder carries a depending glass scoring device. Each scoring device preferably includes a pivoted rod 30 against which a leaf spring 30$^a$ bears to yieldably hold the rod in vertical position. On the end of each rod 30 is a diamond or other suitable glass cutting element 30$^b$. The diamonds 30$^b$ are at such an elevation that they will bear with pressure against a sheet of glass resting on a table passing therebeneath.

Along each side of the square track, immediately in advance of the second cutter, is a loading station. At these loading stations, workmen will transfer sheets of glass from a truck to the tables. Trucks are indicated at A', B', C', and D'. These trucks indicate the approximate position of the loading stations. For instance, a sheet of glass will be transferred from the truck A' to the table 13. The sheet of glass on table 13 will then be carried under the scoring devices on arch 28. This will score the glass in one direction. The table will then move onto the elevator in corner A and be lowered. As the table moves off the elevator, it will pass under arch 21, where the glass thereon will be scored at right angles to the scoring done by the devices on arch 28. As the glass will break along the line of the score, the sheet may be removed from the table onto a suitable receiving platform, where it can be broken into pieces according to the manner in which it is scored. At the same time, the glass may be placed on each of the other tables and scored in a similar manner.

Immediately after passing the second scoring stand, each table moves opposite a pusher which forces the scored sheet from the able onto a receiving platform. The receiving platforms are designated A$^2$, B$^2$, C$^2$, and D$^2$, respectively. These pushers may be of any preferred construction. They are generally indicated at A$^3$, B$^3$, C$^3$, and D$^3$, respectively. Each pusher as shown, includes a cylinder 31, a piston rod 31$^a$ operated thereby, and a transverse pusher bar 32 on the outer end of the piston rod. The pusher bar 32 is at the proper elevation to engage and remove a sheet of glass from a table as the table moves in front of it. I have shown pipes 33 attached to one end of each cylinder for transmitting pressure thereto, to extend the pusher, and pipes 34 connected with the opposite ends of the cylinders for introducing fluid under pressure to the cylinders in the reverse direction for retracting the pushers. The flow of fluid under pressure to the cylinders may be controlled by single valve 35, such for instance, as that shown in detail in Fig. 4. This valve is preferably electrically operated. I have shown an operating extension 35$^a$ for the valve having a double armature 36, associated with opposed solenoids 37 and 38 respectively. Solenoid 37 is energized to introduce fluid to pipe 33, and solenoid 38 is energized to introduce fluid under pressure to pipes 34. The control for these solenoids may be hereinafter more fully described.

A revolving brush 40 is provided across the track between each pushing mechanism and the succeeding glass receiving station. The purpose of this brush is to clean the tables as they pass therebeneath, and sweep off any glass chips or pieces of broken glass. Each brush may be driven by a suitable electric motor 41.

It will be apparent that the tables must be intermittently moved in order that the apparatus may be suitably operated. For instance, it is necessary that the driving chains 14, 15, 16, and 17 be stopped when the tables are moved onto the elevators and during the time that the elevators are rising and lowering. These chains must start when the elevators reach the limit of their movement, and they must stop again when the tables are positioned directly in front of the pushers. They must start again just as soon as the sheet of scored glass has been removed.

Inasmuch as the tables are all moved in unison, and from a common driving means, and inasmuch as the sides of the squares are all of the same length, it will be apparent that the tables all move into corresponding positions at the same time. Consequently, a suitable control may be positioned in the apparatus so as to be operated by the tables as they move successively past the control. Besides, imparting an intermittent movement to the tables, it is necessary to automatically control the raising and lowering of the elevators and the extension and retraction of the pushers.

The automatic control for stopping and starting the movement of the tables and for performing the other necessary functions, is diagrammatically outlined in Fig. 7. In this figure, 45 designates an electro-magnetic control switch for the drive motor 20. The switch includes a centrally pivoted switch arm 45' actuated to motor stopping position by the energization of coil 45$^a$, and to motor starting position by the energization of coil 45$^b$. At a position adjacent one of the elevators, such for instance, as the elevator at corner A, is a suitable switch 46. This switch is adapted to be actuated by projections P on the tables 13, as such tables move onto the elevator. Inasmuch as the projection is at the extreme rear end of the table, the switch will not be actuated until the table is entirely on the platform of the elevator. Operation of switch 46 closes a circuit from a power line 47, through solenoid 42 back to a power line 48. The closing of this switch also closes a circuit from power line 47, through motor stopping coil 45$^a$ of motor control switch 45 back to power line 48. Energization of solenoid 42 operates a control valve 50. Control valve 50 is so arranged that when solenoid 42 is energized it will cause elevators at corners A and C to lower and will cause elevators at corners B and D to rise. In the path of the elevator platform at corner A is a switch 51 adapted to be closed when the elevator platform is in its lowermost position. Closing of this switch closes a circuit from power line 47 through coil 45$^b$ back to the power line 48. This operates the motor control switch to motor starting position. When the tables have moved entirely off the elevator platform, projection P closes a switch 52 that energizes solenoid 43 from power lines 47 and 48 to operate valve 50 in the reverse direction. Operation of valve 50 by the energization of solenoid 43 functions to return the several elevators to their normal positions.

When the table moves along track 5, and is directly opposite the pusher at A$^2$ the projection P on the table closes a switch 53. When this switch is closed, solenoid 37 is energized from power lines 47 and 48 to cause the valve 35 to introduce pressure into pipes 33 to cause the several pushers to be projected. At the same instant, switch 53 energizes motor stopping coil 45$^a$ to stop the movement of conveyor chains. When the pusher bar has traveled the full distance across the table, it engages a switch 54 to close a circuit through solenoid 38, to operate valve 34 to a position where pressure will be communicated with pipes 34, to thereby effect a retracting movement of the pushers. Switch 54, when closing, also closes a circuit from power lines 47 and 48 through coil 45$^b$ to again start the motor. In this manner, the operation and control of the apparatus is rendered entirely automatic. Since the movement of the tables to the respective stations is concomitant, a single set of control switches 46, 51, 52, 53, and 54 is sufficient for controlling the entire apparatus.

While I have illustrated the foregoing circuit and apparatus as one method of effecting this automatic control, it will be understood that various changes and departures may be made therein as may be required or desirable, the above circuit being described merely as illustrating one method by which this may be accomplished.

In Fig. 5 I have illustrated an apparatus embodying the same general principle of operation but wherein the track is of a continuous nature and the tables are provided with rotatable tops whereby the tops of the tables can be rotated at right angles to the line of travel and thereby eliminate any necessity for means to turn the entire table, as is required of the elevators in the construction as shown in Fig. 1.

In Fig. 5, 60 represents a continuous loop of track having parallel sides and curved ends. The length of the track may be extended to any length required to provide, if so desired a plurality of cutting and loading stations along each of the parallel sides of the loop. Mounted for travel along the tracks are a plurality of tables 61 having rotatable tops 62. In Fig. 6, 61 designates the frame of the table and 62 is the revolving top. 63 designates suitable bearings to permit of the easy rotation of the top of the table on the frame. It is desired that the top of the table rotate only 90° at each period of rotation, and in order to limit such rotation of the table top, I have shown a spring-projected detent 64 carried on the frame at 61$^a$. This detent has a roller 64$^a$ adapted to engage in suitably located notches 64$^b$ in the table top. These notches are so located that when the table is rotated through an arc of 90° the roller of the detent will be projected into the notch to yieldably hold the table top against further rotation.

Associated with the track 60 is a continuous cable or chain 65 driven by a suitable driving mechanism at 66, this mechanism including a motor 67. The cable elements 68 adapted to engage the tables to transmit motion to the tables when the cable is being driven.

Positioned along the track at suitable intervals are abutments 69. These are so located that when a table is moved past an abutment, the abutment will engage the table top so that, as the table continues to move, the table top will be rotated through an arc of 90°.

Positioned at suitable points over the parallel sides of the track are stands 70 carrying cutters 71, the construction and arrangement of these stands and cutters being in all respects similar to the cutter stands described in connection with the construction shown in Fig. 1.

Loading stations may be provided at suitable points along the tracks. The approximate position of some of these loading stations is designated at the point where the supply trucks 72 are indicated. Arranged along the track at suitable positions with respect to the loading stations and to the cutting stands are glass removing stations. Those include receiving or breaking tables 73 and glass removing pushers 74. Pushers 74 correspond in all respects to those previously described in connection with Fig. 1. Suitably positioned along the track with respect to the unloading stations and to the loading stations are table cleaning brushes 75. These brushing units are also similar to the corresponding units described in connection with Fig. 1.

A fluid pressure supply to extend and retract the pushers may be controlled by a solenoid actuated valve at 76.

In operation all of the tables, being driven from the same cable 65ª move together and they are so positioned with respect to one another that they all move past corresponding stations along the track at the same time. A suitable control, including contacts actuated by the movement of the tables, may be provided for starting and stopping the driving motor 67 at the glass removing stations and for operating the valve 76 at the proper time to effect the extension and retraction of the pushers. Such a circuit and control system may be readily devised by any one skilled in the art, and any suitable circuit and arrangement of contacts may be provided.

As the tables move from the receiving stations, the glass is carried beneath the scoring stands and the glass is scored in one direction. After being thus scored, the tables move past the abutments 69, whereupon the table top with the scored sheet of glass is rotated 90°. After the tops have been rotated, the tables move beneath other scoring stands which cut the glass transversely to the line of the first cuts.

In each form of the invention the glass is carried under one scoring stand and then turned to a position at 90° to its former position and carried beneath a second scoring stand. After being scored the second time, the glass is removed to a breaking or receiving table, and the tables are brushed clean before moving to the next receiving station.

Various changes and modifications may be made in the construction of the detailed parts, it being understood that the drawings are generally diagrammatic and are merely illustrative of the spirit of my invention.

I claim as my invention:

1. Apparatus for cutting glass including a pair of cutting stands, a glass support movable successively beneath the stands, and means for turning the direction of travel of the glass support ninety degrees between the first and second cutting stands.

2. Apparatus for cutting glass including a pair of cutting stands, adjustable cutters on the stands, a glass support movable successively beneath the stands, and means for turning the direction of travel of the glass support ninety degrees between the first and second cutting stands.

3. Apparatus for cutting glass into sheets including a track, a cutting stand associated with the track, a table movable along the track beneath the cutting stand and adapted to support the glass to be cut into sheets, means for moving the table, and means for removing glass sheets from the table.

4. Apparatus for cutting glass into sheets including a track, a plurality of cutting stands arranged at intervals along and above the track, a table movable along the track beneath the stands and adapted to support the glass to be cut into sheets, and means along the track for removing glass sheets from the table.

5. Apparatus for cutting glass including a continuous track, a table movable around the track in one direction and adapted to support the glass to be cut, means for moving the table around the track, and cutting stands arranged at intervals along and above the track.

6. Apparatus for cutting glass including a continuous track having two parallel sides, a table movable along the track and adapted to support the glass to be cut, and a pair of cutting stands arranged at intervals along and above each parallel side of the track.

7. Apparatus for cutting glass including a track having two parallel sides, a pair of cutting stands arranged at intervals along and above each of the parallel sides, a table adapted to move along the track and adapted to support sheets of glass to be cut, and a glass removing pusher along each parallel side of the track.

8. Apparatus for cutting glass including a loop of track, a pair of cutting stands arranged at intervals along and above the track, a table adapted to move along the track and support the glass to be cut into sheets, and means for moving the table.

9. Apparatus for cutting glass including a loop of track, a pair of cutting stands arranged at intervals along and above the track, a table having a rotatable top movable along the track and adapted to support the glass to be cut into sheets, means for moving the table and means between the first and second cutting stands of the pair for rotating the table top through an arc of ninety degrees.

10. Apparatus for cutting glass including a loop of track, a pair of cutting stands arranged at intervals along and above the track, a table having a rotatable top movable along the track and adapted to support the glass to be cut into sheets, means for moving the table, means between the first and second cutting stands of the pair for rotating the table top through an arc of ninety degrees, and means along the track after the second stand for removing cut sheets from the table.

11. Apparatus for cutting glass including a loop of track, a pair of cutting stands arranged at intervals along and above the track having glass scoring means thereon, a glass carrying table movable along the track and adapted to support the glass to be cut into sheets, means for moving the table along the track under the stands to subject the glass to the scoring action of the scoring devices of one stand and then of the other, means for turning the glass with respect to the first scoring stand after the table has passed the first stand and before it has reached the second one.

12. Apparatus for cutting glass including a looped track, a pair of cutting stands arranged at intervals along and above the track, a table mounted for travel on the track and adapted to support the glass to be cut, a glass removing pusher along the track past which the table moves after moving beneath the cutting stands, and a table brush extending across the track beyond the cutting stands.

13. Apparatus for cutting glass including a looped track, a plurality of tables movable along the track, means for moving the tables in synchronism, a loading station along the track for each table, a pair of cutting stands for each table, a glass removing station along the track for each table and beyond the cutting stands, and a table brushing unit between each unloading and loading station.

In testimony whereof I affix my signature.

THOMAS H. CHADWICK.